G. L. KNIGHTS.
FRAME FOR SAW TABLES.
APPLICATION FILED AUG. 5, 1907.
981,431.
Patented Jan. 10, 1911.
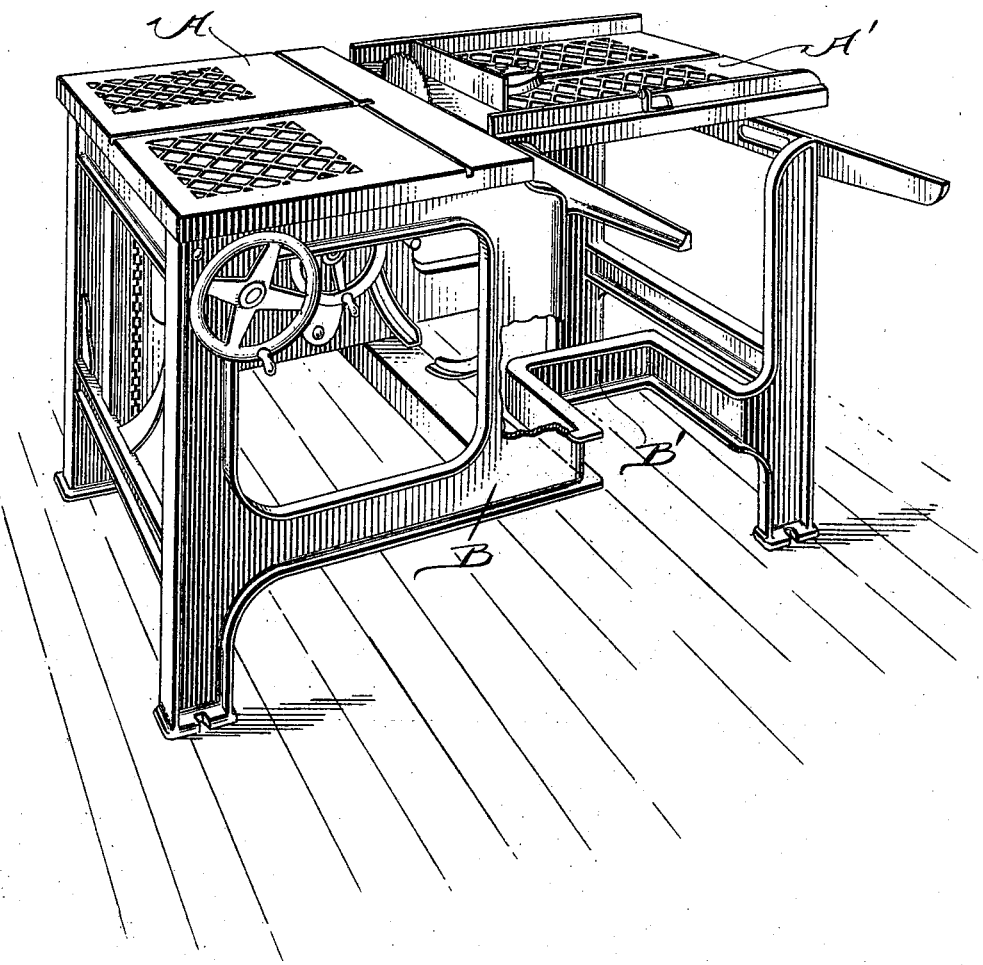
Witnesses
Oliver W. Holmes
E. B. McBath
Inventor
George L. Knights,
By O'Meara & Birch
Attorneys

UNITED STATES PATENT OFFICE.

GEORGE L. KNIGHTS, OF AMESBURY, MASSACHUSETTS.

FRAME FOR SAW-TABLES.

981,431.

Specification of Letters Patent. Patented Jan. 10, 1911.

Application filed August 5, 1907. Serial No. 387,120.

*To all whom it may concern:*

Be it known that I, GEORGE L. KNIGHTS, a citizen of the United States, residing at Amesbury, in the county of Essex and State of Massachusetts, have invented a new and useful Improvement in Frames for Saw-Tables, of which the following is a specification.

This invention relates to a saw table frame and I have shown it as applied to what is known as the Howard saw table although it can be used in connection with any table with which there is a traveling portion. The ordinary machine of this kind is mounted upon a rectangular frame or table and the operator in sawing various pieces of stock pushes the sliding table backward and forward past the saw and in order to push the table back clear of the saw it is necessary to lean over or to step over a horizontal portion of the saw table frame. This reduces the speed with which the operator can work and many operators have received minor injuries and are exposed to serious accidents in thus stepping forward and backward over the table frame. My invention overcomes this objection to the frame now in use and enables the operator to work much more rapidly than with the old form of table and at the same time with less physical exertion.

The invention consists of the novel features of construction hereinafter fully described, pointed out in the claim and shown in the accompanying drawing.

In the drawing I have shown a perspective view of a saw table of the type referred to in which—

A represents the table proper and A′ the sliding table pushed and pulled by the operator.

The horizontal portion B, at the side of the frame which will be termed the front instead of being carried straight across the machine from end to end as is usual is inwardly off-set beneath the moving table A′ as shown at B′ thus forming a U-shaped inwardly extending extension of the side of the frame into which the operator can walk as he pushes the table thus entirely obviating the objectionable features above referred to.

While I have shown the front brace bar B, and its extension B′, as being formed of one piece it will be obvious that if desired it can be formed of a number of pieces bolted, riveted or otherwise fastened together.

Having thus fully described my invention what I claim as new and desire to secure by Letters Patent is:—

A frame of the kind described having a movable carriage thereon, said frame having supporting legs, and a front horizontal portion connecting the front legs of the frame at points midway their ends, said horizontal portion being inwardly offset in vertical alinement with the path of travel of the carriage.

GEORGE L. KNIGHTS.

Witnesses:
GEORGE CROSSLAND,
GEORGE L. VINCENT.